Oct. 23, 1951     O. J. SMITH     2,572,286
FRUIT JUICER
Filed March 10, 1947     2 SHEETS—SHEET 1
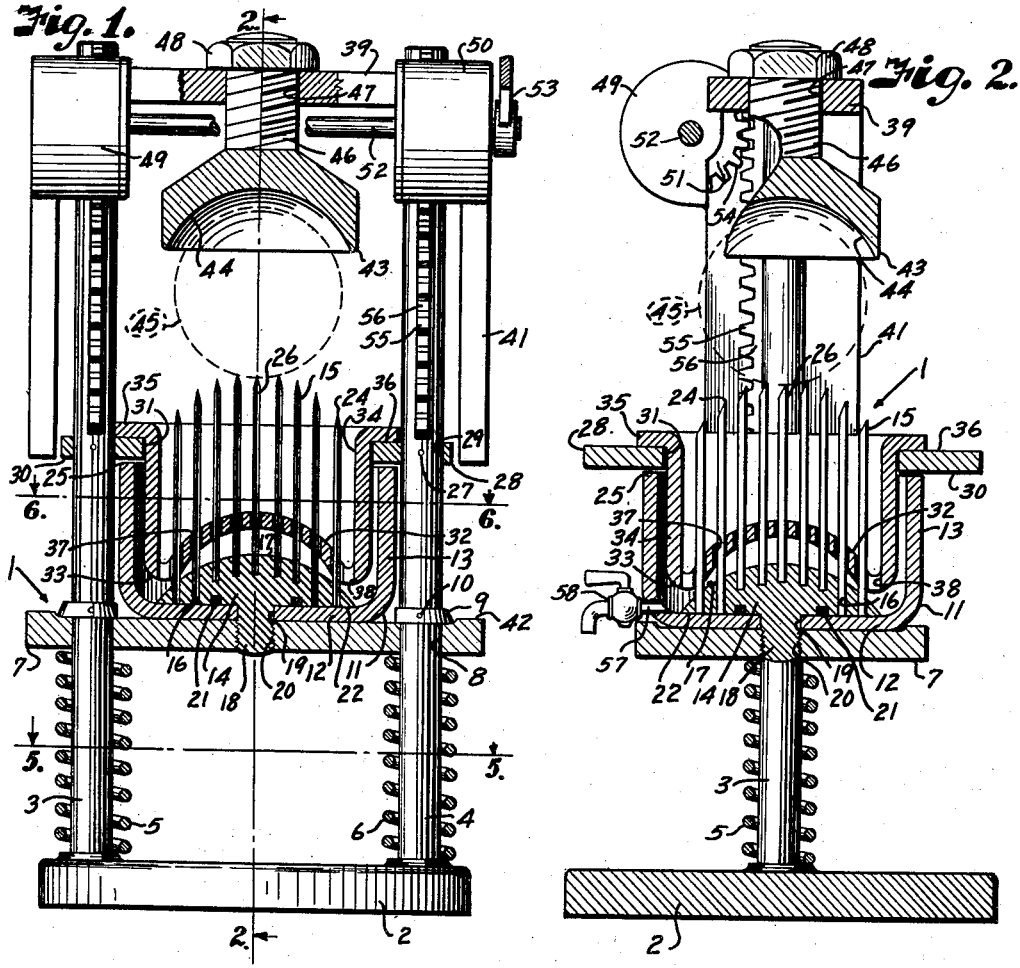
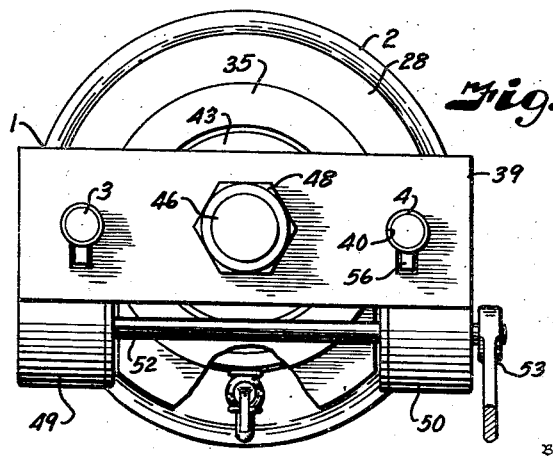
Inventor
Oscar J. Smith
By
Fishburn & Mullendore
Attorneys Oct. 23, 1951     O. J. SMITH     2,572,286
FRUIT JUICER
Filed March 10, 1947     2 SHEETS—SHEET 2
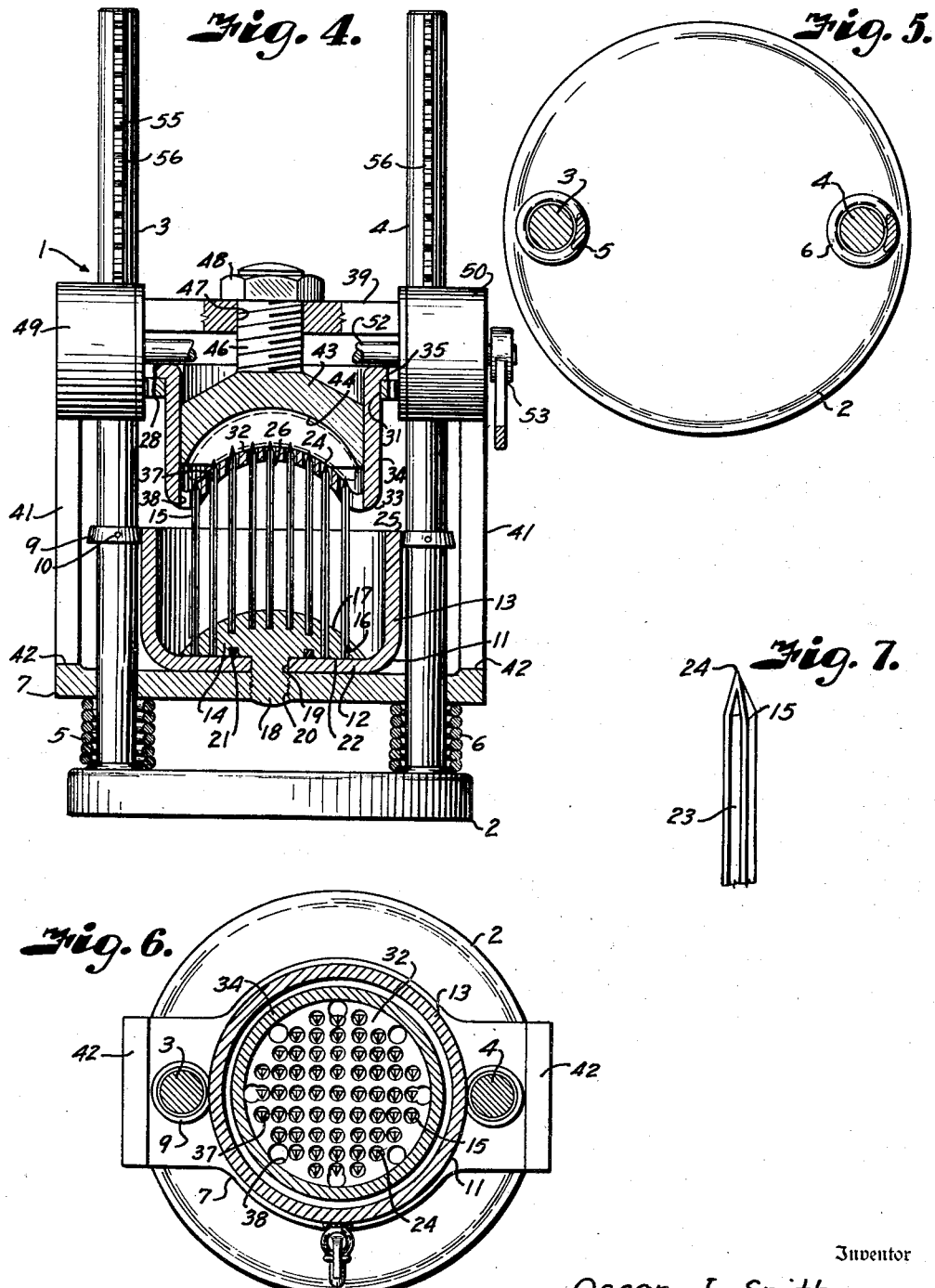
Inventor
Oscar J. Smith Patented Oct. 23, 1951

2,572,286

UNITED STATES PATENT OFFICE 2,572,286

FRUIT JUICER

Oscar J. Smith, Tulsa, Okla.

Application March 10, 1947, Serial No. 733,518

10 Claims. (Cl. 100—50)

This invention relates to a device for extracting juice from fruit such as oranges, lemons, and the like, and more particularly to a mechanical device for piercing, squeezing, and draining juice from citrus fruit.

It is customary in juicing fruit to halve or otherwise cut the fruit and by crushing and/or grinding the pulp, remove the juice therefrom. As a result considerable pulp and other undesirable fibrous material, seeds, and the like, are contained in the juice obtained, requiring straining and the extra handling of separated rind and pulp, seed and the like for disposing of same.

The objects of the present invention are to provide a fruit juicer that operates on the entire fruit to remove the juice therefrom in one operation without said fruit being previously cut or otherwise handled; to provide a juicer for piercing, squeezing and recovering juice from fruit and the ejection of the rind in one piece containing substantially all of the seed, pulp and other fibrous material; to provide a juicer with fruit piercing devices formed for facilitating removal of juice from the fruit; to provide a device for juicing fruit with a minimum of handling, thereby obtaining more sanitary recovery of juice; and to provide a sturdy, efficient apparatus of this character for quickly removing juice substantially free of pulp, fibers and seed from fruit in one operation and ejecting the rind to facilitate disposal thereof.

In accomplishing these and other objects of the present invention, I have provided improved details of structure, the preferred forms of which are illustrated in the accompanying drawings, wherein:

Fig. 1 is an elevational view of a juicer embodying the features of the present invention, portions being broken away to illustrate the structure thereof.

Fig. 2 is a vertical transverse sectional view through the juicer on the line 2—2, Fig. 1.

Fig. 3 is a plan view of the juicer.

Fig. 4 is a view similar to Fig. 1, with the pressure device moved downwardly illustrating the position of the respective parts when the fruit juicing spears are substantially removed from the rind of the fruit.

Fig. 5 is a horizontal sectional view on the line 5—5, Fig. 1.

Fig. 6 is a horizontal sectional view on the line 6—6, Fig. 1.

Fig. 7 is an enlarged detail perspective view of the upper portion of a piercing spear particularly illustrating the groove for facilitating drainage of the juice from the fruit.

Referring more in detail to the drawings:

1 designates a juicing apparatus consisting of a base 2 of any desired configuration, having a standard of any cross-sectional contour extending upwardly therefrom for supporting the fruit juicing apparatus. In the illustrated device, the standard consists of spaced guide posts 3 and 4 having sleeved thereon compression springs 5 and 6 providing resilient support for a plate 7, said plate having apertures 8 through which the posts extend for slidably mounting the plate on said guide posts. Collars 9 are secured to the posts by means of pins 10 in spaced relation to the base 2 for limiting the upward motion of the plate 7 in response to pressure of the springs 5 and 6, said plate 7 being shown at the upper limit of its travel in Fig. 1.

Resting on the plate 7 and suitably secured thereto is a cup 11 having a bottom 12 and side walls 13 providing a recess of desired capacity for containing juice extracted from fruit as later described. Mounted in the cup 11 is a spear holder 14 carrying a plurality of spears 15 for piercing fruit as later described. The spears may be supported in any suitable manner, however, in the particular embodiment of the invention illustrated the spears are supported in recesses 16 spaced over the upper face 17 of the spear holder 14, said holder preferably being in the form of a spherical segment arranged coaxially of the cup 11 and having a depending threaded stud 18 extending through a central aperture 19 in the bottom wall 12 of the cup 11 and screwed in a threaded aperture 20 in the plate 7 to secure the spear holder and cup to the plate 7, a gasket 21 being provided in the bottom face 22 of the holder 14 for sealingly engaging the bottom of the cup and preventing leakage of juice therefrom.

The spears 15 are preferably rigidly secured in the holder 14 whereby they cover in substantially uniform spacing the face area of the spear holder, said spears extending vertically and in parallel relation from said spear holder. As illustrated in Figs. 6 and 7, the bodies of the spears are preferably triangular in shape and provided in one side thereof with an open channel 23 to permit the flow of fluid down the length of the spear. The upper ends of the spears are pointed, as at 24, the points preferably being in the plane of the open side of the spear channels. Other shapes of spears may be used and provided with a suitable channel with the point of the spear arranged relative to the channel whereby fruit punctured by the spear will not tend to close into the channel thereof. The spears are of such length that their upper ends terminate substantially above the rim 25 of the cup 11 and define a spherical envelope with the exception of the center spear 26 which is slightly shorter than the adjacent spears whereby an article of fruit may be placed on the ends of the spears and will rest thereon.

Mounted on the posts 3 and 4, as by pins 27, is a ring 28 having apertures 29 through which the posts extend. The ring 28 is mounted in such a manner that its lower face 30 is slightly spaced from the upper edge 25 of the cup 11 when said cup is at the upper limit of the travel as defined by the position of the collars 9. The ring 28 is provided with a central bore 31 coaxial with the cup 11 to support a lower pressure plate 32 in the cup 11. The pressure plate 32 is preferably upwardly bulged and of spherical contour terminating, as at 33, in upwardly directed side walls 34, the upper ends of said walls 34 being provided with a peripheral horizontally directed flange 35 adapted to engage the upper face 36 of the ring 28 to support the pressure plate 32 therefrom. The flange 35 and walls 34 are preferably cylindrical in shape, the wall 34 being spaced from the walls 13 of the cup 11 and capable of passing freely through the opening 31 in the ring whereby, as shown in Fig. 1, the pressure plate is supported by the flange 35 and depends therefrom into the cup 11, into close proximity with the upper face 17 of the spear holder 14. The pressure plate 32 is provided with a plurality of apertures 37 aligning with the spears 15 whereby the spears extend upwardly through the apertures 37. Said pressure plate is also provided with a plurality of apertures 38 adjacent the walls 34 to provide openings for complete drainage of fluid from above the pressure plate into the cup 11.

Slidably mounted on the upper extremity of the guide posts 3 and 4 is a bar 39 having apertures 40 spaced thereon for slidably engaging the posts 3 and 4, whereby said posts serve as guides for the bar 39. The ends of the bar 39 extend beyond the posts 3 and 4 and are provided with vertically dependent arms 41 spaced outwardly from the posts 3 and 4 sufficiently to clear the ring 28 and when moved downwardly engage shoulders 42 on the ends of the plate 7 to move the plate 7, cup 11 and spears 15 downwardly as later described. Suitably mounted on the bar 39 and coaxially of the cup 11 is a pressure member 43 having its lower face concaved, as at 44, to engage over fruit, such as indicated by the dotted lines 45, Fig. 1. The upper end of the pressure member is preferably provided with a threaded stud 46, preferably adjustably threaded into a threaded aperture 47 in the bar 39 and secured in adjusted position by a lock nut 48 threaded on the stud 46 and into engagement with the upper face of the bar 39.

A vertical operating force may be applied to the bar 39 and pressure member 43 in any suitable manner. In the illustrated structure, the operating mechanism consists of housings 49 and 50 extending forwardly and downwardly from the bar 39 and adapted to enclose gears 51 therein, said gears being keyed through a shaft 52 rotatably mounted in the housing and extending outwardly from one of said housings to mount a handle 53. Both of the gears 51 are mounted on the shaft 52 whereby they are rotated simultaneously and the teeth 54 of said gears engage teeth 55 of racks 56 mounted on the posts 3 and 4 whereby pressure on the handle 53 rotates the shaft 52 and gears 51 to apply a downward pressure on the bar 39 and pressure member 43.

While the cup 11 has been illustrated as secured to the plate 7 by the spear holder 14 and stud 18, other fastening devices may be used which permit removal of the cup. For convenience with any type of mounting of the cup, a drain 57 is provided adjacent the bottom of the cup 11 and controlled by a valve 58 whereby juice collected in the cup may be drained therefrom into a glass or other container.

In operating a juice extracting apparatus constructed as described, the fruit is placed in the apparatus as shown at the dotted lines 45, resting on the declivity produced by the short central spear 26 and a suitable operating force applied to the pressure plate 43 to move same downwardly until the concave surface contacts the fruit. In the structure illustrated, pressure is applied to the handle 53 rotating the shaft 52 and rotating the gears 51 in an anticlockwise direction (Fig. 2), whereby engagement of the teeth 54 of said gear with the teeth 55 of the rack 56 applies pressure to the gear housings 49 and 50 and to the bar 39 to move the entire head assembly on which the pressure plate is adjustably secured downwardly on the guide posts 3 and 4. After the fruit is engaged by the concaved surface 44 it is supported thereby on the spears 15, and continued operation of the lever 53 provides further motion of the head assembly forcing the fruit downwardly, causing the spears 15 to each puncture the lower skin of the fruit. It will be noted that the spears are retained against downward motion by the springs 5 and 6. Operation of the handle is continued, effecting further downward movement of the head assembly and pressure plate 43 impaling the fruit on the spears 15 until the arms 41 contact the shoulders 42 on the plate 7. In this position the spears have passed almost through the fruit and up to but not entering the upper skin or rind thereof, the spacing between the ends of the spears 15 and the concave surface 44 being controlled by the adjustment of the pressure plate on the bar 39. The fruit is thus substantially run through by the plurality of spears, each of which provides a juice course through the channel of the spear downwardly through the apertures 37 in the lower pressure plate 32 to the bottom of the cup 11, the point of the spears 15 being in the plane of the open side of the spear so that as the fruit is punctured by the spear the opening will not tend to close into the channel thereof. With the arms 41 in contact with the shoulders 42 on the plate 7, further downward motion of the head assembly and pressure plate 43 will cause the pressure plate 43, cup 11, spear holder 14, spears 15 and plate 7 to move as a unit, compressing the springs 5 and 6 and holding a fixed distance between the spear ends and the concave surface 44, the lower pressure plate 32 being supported by the ring 28 remaining in a stationary position. Therefore, as the pressure plate 43 advances downwardly the fruit will be squeezed between the surface 44 and the spherical lower pressure plate 32, expelling the juice through the channels 23 of the spears 15 to the cup 11, said spears being substantially withdrawn from the fruit during the squeezing operation. At the lowest extreme position of the head the fruit has been reduced substantially to a double thickness of rind, retaining the seeds and pulp and resting on the lower pressure plate 32, the spears being substantially removed from the fruit, having only slight penetration into the bottom rind thereof. Therefore, as the movement of the handle 53 is reversed and the head assembly raised, the plate 7, cup 11, spear holder 14 and spears 15 will follow it upward, the spent rind being carried on the tips of the spears until the apparatus is in the position illustrated in Fig. 1, whereupon the rind may be picked off the spear tips and disposed of with the seeds and pulp retained therein. As the juice drains from the spears into the cup 11 it is withdrawn to a glass or other suitable container through the valve controlled drain 57.

To disassemble the apparatus for cleaning, the lower pressure plate may be lifted off of the spears 15 and thus removed. The cup 11 may be rotated unscrewing the stud 18 from the threaded aperture 20, whereby the spear holder 14 and cup 11 may be removed from the plate 7. The nut 48 may also be removed permitting the pressure plate 43 to be unscrewed from the bar 39, whereby all of the parts contacting the fruit may be thoroughly cleaned.

From the foregoing it is believed obvious that I have provided a sturdy juicing apparatus capable of extracting all of the juice from citrus fruit and the like and obtaining same free of fibrous materials and seed, further providing a more sanitary product by eliminating the necessity of halving or otherwise cutting the fruit before juicing.

What I claim and desire to secure by Letters Patent is:

1. A fruit juicer comprising, a plurality of substantially triangular shaped fruit piercing spears each having a channel in one side thereof, a plate for moving the fruit toward the spears for impaling said fruit on the spears whereby the spears extend substantially through the fruit to be juiced, means for squeezing the fruit while on the spears whereby the channels in the spears form passages for flow of juice from the fruit, and a bar positioned laterally of said spears and plate and movable with said plate for progressively moving the spears substantially from the fruit as said fruit is being squeezed.

2. A fruit juicer comprising, a pair of pressure plates, one of said plates having a plurality of apertures therein, a plurality of substantially triangular shaped fruit piercing spears extending through said apertures in the pressure plate, said spears each having an open longitudinal channel in one side thereof, the pointed tips on the spears each lying substantially in the plane of the corresponding channel opening, means for effecting relative movement of the pressure plates toward each other for impaling the fruit to be juiced on said spears and squeezing said fruit to extract the juice therefrom, and arms fixed to one end of said pressure plates for progressively removing the spears substantially from the fruit as said fruit is being squeezed.

3. A fruit juicer comprising, a standard, a pressure plate having a plurality of apertures therein mounted on the standard, a plurality of fruit piercing spears slidably supported on the standard, said spears extending through the apertures in the pressure plate, a second plate for moving fruit to be juiced onto the spears and into engagement with the pressure plate for squeezing the fruit, said spears extending substantially through said fruit, and a bar positioned laterally of said spears and plates and movable with said second plate for progressively moving the spears substantially from the fruit as said fruit is being squeezed.

4. A fruit juicer comprising, a standard, a pressure plate having a plurality of apertures therein mounted on the standard, a plurality of fruit piercing spears having open longitudinal channels therein slidably supported on the standard, said spears extending through the apertures in the pressure plate, means for moving fruit to be juiced onto the spears and into engagement with the pressure plate for squeezing the fruit, said spears extending substantially through said fruit, an arm fixed to the fruit moving means for progressively removing the spears substantially from the fruit as said fruit is being squeezed, and means for receiving and containing the juice from said fruit.

5. A fruit juicer comprising, a standard, a cup member slidably mounted on the standard, a lower pressure plate having apertures therein, means supporting the lower pressure plate on the standard, a plurality of fruit piercing spears carried by said cup member and having longitudinal channels therein, said spears being adapted to extend through the apertures in the lower pressure plate, an upper pressure plate, means for moving the upper pressure plate toward the lower pressure plate for impaling the fruit on the spears and squeezing said fruit to extract the juice therefrom, and means for progressively removing the spears substantially from the fruit as said fruit is being squeezed.

6. A fruit juicer comprising, a standard, a cup member slidably mounted on the standard, a lower pressure plate having apertures therein, means supporting the lower pressure plate on the standard, a plurality of fruit piercing spears carried by said cup member and having open longitudinal channels therein, the points on said spears each lying in the plane of the corresponding channel opening, said spears being adapted to extend through the apertures in the lower pressure plate, an upper pressure plate, means for moving the upper pressure plate toward the lower pressure plate for impaling the fruit on the spears and squeezing said fruit to extract the juice therefrom, means responsive to movement of the upper pressure plate for progressively removing the spears substantially from the fruit as said fruit is being squeezed, and means for removing juice collected in the cup.

7. A fruit juicer comprising, a base, a standard on the base, a cup member slidably mounted on the standard, resilient means applying upward pressure on the cup member, a lower pressure plate having apertures therein, means supporting the lower pressure plate on the standard and in the cup member when said cup member is in its upper position, a plurality of fruit piercing spears carried by said cup member and having open longitudinal channels therein, the points on said spears each lying in the plane of the corresponding channel opening, said spears being adapted to extend through the apertures in the lower pressure plate, an upper pressure plate, means for moving the upper pressure plate toward the lower pressure plate for impaling the fruit on the spears and squeezing said fruit to extract the juice therefrom, means responsive to movement of the upper pressure plate for progressively removing the spears substantially from the fruit as said fruit is being squeezed, and means for removing juice collected in the cup.

8. A fruit juicer comprising, a base, a standard on the base, a cup member slidably mounted on the standard, resilient means applying upward pressure on the cup member, a lower pressure plate having apertures therein, means supporting the lower pressure plate on the standard, a plurality of fruit piercing spears carried by the cup member and having an open channel extending longitudinally thereof, the points on the upper ends of said spears each arranged in the plane of the corresponding channel opening, said spears extending through the apertures in the lower pressure plate and arranged substantially throughout the entire area thereof, an upper pressure plate, a head member slidably mounted on the standard, means for moving the head member downwardly toward the lower pressure plate for impaling the fruit on the spears and squeezing said fruit to extract the juice therefrom, said spears extending substantially through the fruit, and means on the head member for moving the cup downwardly on the standard for progressively removing the spears substantially from the fruit as said fruit is being squeezed.

9. A fruit juicer comprising, a base, a standard on the base, a cup member slidably mounted on the standard, resilient means applying upward pressure on the cup member, a lower pressure plate having apertures therein, means supporting the lower pressure plate on the standard, a plurality of fruit piercing spears carried by the cup member and having an open channel extending longitudinally thereof, the points on the upper ends of said spears each arranged in the plane of the corresponding channel opening, said spears extending through the apertures in the lower pressure plate and arranged substantially throughout the entire area thereof with the points of the spears defining a substantially spherical contour, an upper pressure plate having a spherical shaped recess in the lower face thereof, a head member slidably mounted on the standard, means adjustably supporting the upper pressure plate on the head member, means for moving the head member downwardly toward the lower pressure plate for impaling the fruit on the spears and squeezing said fruit to extract the juice therefrom, said spears extending substantially through the fruit, and means on the head member for moving the cup downwardly on the standard for progressively removing the spears substantially from the fruit as said fruit is being squeezed.

10. A fruit juicer comprising, a base, a standard on the base, a cup member slidably mounted on the standard, resilient means applying upward pressure on the cup member, a lower pressure plate having apertures therein, means supporting the lower pressure plate on the standard whereby said pressure plate is in the cup when said cup is in its upper position, a plurality of fruit piercing spears having an open channel extending longitudinally thereof, the points on the upper ends of said spears each arranged in the plane of the corresponding channel opening, means located in the cup member for supporting the spears in spaced parallel relation, said spears extending through the apertures in the lower pressure plate and arranged substantially throughout the entire area thereof with the points of the spears defining a substantially spherical contour, an upper pressure plate having a spherical shaped recess in the lower face thereof, a head member slidably mounted on the standard, means adjustably supporting the upper pressure plate on the head member, means on the head member having engagement with the standard for moving the head member downwardly toward the lower pressure plate for impaling the fruit on the spears and squeezing said fruit to extract the juice therefrom, said spears extending substantially through the fruit, means on the head member for moving the cup downwardly on the standard for progressively removing the spears substantially from the fruit as said fruit is being squeezed, and means for draining juice collected in the cup therefrom.

OSCAR J. SMITH.

REFERENCES CITED

The following references are of record in the file of this patent:

UNITED STATES PATENTS

| Number | Name | Date |
| --- | --- | --- |
| 1,960,501 | Maull | May 29, 1934 |
| 2,174,909 | McCulloch | Oct. 3, 1939 |
| 2,346,561 | Delay | Apr. 11, 1944 |
| 2,446,812 | Cribb et al. | Aug. 10, 1948 |
| 2,522,800 | Quiros | Sept. 19, 1950 |

FOREIGN PATENTS

| Number | Country | Date |
| --- | --- | --- |
| 780,268 | France | Jan. 29, 1935 |